(12) United States Patent
Volpe et al.

(10) Patent No.: US 10,397,116 B1
(45) Date of Patent: Aug. 27, 2019

(54) ACCESS CONTROL BASED ON RANGE-MATCHING

(71) Applicant: Amazon Technologies, Inc., Seattle, WA (US)

(72) Inventors: Thomas A. Volpe, Austin, TX (US); Chin Cheah, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 15/588,390

(22) Filed: May 5, 2017

(51) Int. Cl.
*H04L 29/06* (2006.01)
*H04L 12/743* (2013.01)

(52) U.S. Cl.
CPC .......... *H04L 45/7457* (2013.01); *H04L 69/22* (2013.01)

(58) Field of Classification Search
CPC ..... H04L 45/74; H04L 45/7457; H04L 47/20; H04L 63/0236; H04L 63/101
See application file for complete search history.

(56) References Cited

U.S. PATENT DOCUMENTS

| | | | | |
|---|---|---|---|---|
| 6,697,276 B1 * | 2/2004 | Pereira | ............. | G11C 15/00 365/189.07 |
| 6,700,809 B1 * | 3/2004 | Ng | ............. | G11C 15/00 365/236 |
| 6,876,559 B1 * | 4/2005 | Rathnavelu | ............. | G11C 15/00 365/189.07 |
| 6,934,796 B1 * | 8/2005 | Pereira | ............. | G11C 15/00 365/49.17 |
| 6,963,882 B1 * | 11/2005 | Elko | ............. | G06F 9/546 |
| 7,035,968 B1 * | 4/2006 | Pereira | ............. | G11C 15/00 707/999.006 |
| 7,107,265 B1 * | 9/2006 | Calvignac | ............. | H04L 45/742 |
| 7,193,874 B1 * | 3/2007 | Pereira | ............. | G11C 15/00 365/189.02 |
| 7,366,830 B1 * | 4/2008 | Maheshwari | ............. | G11C 15/00 365/49.17 |
| 7,382,637 B1 * | 6/2008 | Rathnavelu | ............. | G11C 15/00 365/189.05 |
| 7,509,674 B2 * | 3/2009 | Sterne | ............. | H04L 45/00 709/224 |
| 7,558,564 B2 * | 7/2009 | Wesby | ............. | G06Q 40/00 455/419 |
| 7,571,299 B2 * | 8/2009 | Loeb | ............. | G06F 16/2255 711/216 |

(Continued)

*Primary Examiner* — Eric Nowlin
(74) *Attorney, Agent, or Firm* — Kilpatrick Townsend & Stockton LLP

(57) ABSTRACT

Disclosed are techniques that can be used within network devices to implement access control functionality. The techniques can include use of a content-addressable memory configured including an access control entry stored therein. Circuitry can be coupled to the content-addressable memory and configured to determine that a value is within a range of values. The circuitry can generate a compare key including a field that is set indicating that the value is within the range of values. The circuitry can provide, to the content-addressable memory, the compare key for locating a corresponding access control entry within the content-addressable memory. The circuitry can receive, from the content-addressable memory, an index of the access control entry stored within the content-addressable memory. The circuitry can select, based on the index of the access control entry, an action.

27 Claims, 7 Drawing Sheets

(56) References Cited

U.S. PATENT DOCUMENTS

| | | | | |
|---|---|---|---|---|
| 7,711,900 B2* | 5/2010 | Booth | H04L 49/3009 | 709/213 |
| 7,832,009 B2* | 11/2010 | Wang | H04L 63/101 | 370/241 |
| 7,933,282 B1* | 4/2011 | Gupta | G06F 17/30982 | 370/412 |
| 8,094,659 B1* | 1/2012 | Arad | H04L 45/586 | 370/392 |
| 8,457,622 B2* | 6/2013 | Wesby | G06Q 40/00 | 455/419 |
| 8,509,106 B2* | 8/2013 | Wang | H04L 63/101 | 370/235 |
| 8,521,905 B2* | 8/2013 | Beliveau | H04L 67/327 | 370/224 |
| 8,711,860 B2* | 4/2014 | Beliveau | H04L 67/327 | 370/392 |
| 8,718,064 B2* | 5/2014 | Beliveau | H04L 67/327 | 370/392 |
| 8,767,740 B2* | 7/2014 | Kubsch | H04L 1/1835 | 370/394 |
| 8,861,347 B2* | 10/2014 | Bloch | H04L 47/2441 | 370/230 |
| 8,943,268 B2* | 1/2015 | Sun | G11C 15/00 | 365/49.1 |
| 9,077,668 B2* | 7/2015 | Beliveau | H04L 67/327 | |
| 9,426,063 B1* | 8/2016 | Dropps | H04L 45/52 | |
| 9,497,119 B2* | 11/2016 | Basso | H04L 45/7457 | |
| 9,621,581 B2* | 4/2017 | Thubert | H04L 63/1416 | |
| 9,674,097 B2* | 6/2017 | Memon | H04L 47/10 | |
| 9,860,254 B2* | 1/2018 | Smith | G06F 21/6218 | |
| 9,912,639 B1* | 3/2018 | Wighe | H04L 63/0263 | |
| 9,942,169 B1* | 4/2018 | Detwiler | H04L 49/25 | |
| 2003/0033307 A1* | 2/2003 | Davis | G06F 7/02 | |
| 2007/0192564 A1* | 8/2007 | Loeb | G06F 16/2255 | 711/216 |
| 2008/0222352 A1* | 9/2008 | Booth | H04L 45/7453 | 711/108 |
| 2009/0300759 A1* | 12/2009 | Wang | H04L 63/101 | 726/22 |
| 2010/0037016 A1* | 2/2010 | Stergiou | H04L 45/00 | 711/108 |
| 2011/0113490 A1* | 5/2011 | Wang | H04L 63/101 | 726/22 |
| 2012/0020360 A1* | 1/2012 | Kubsch | H04L 1/1835 | 370/394 |
| 2012/0163392 A1* | 6/2012 | Park | H04L 45/60 | 370/401 |
| 2012/0243686 A1* | 9/2012 | Wesby | G06Q 40/00 | 380/270 |
| 2013/0142039 A1* | 6/2013 | Bloch | H04L 45/7457 | 370/230 |
| 2013/0163426 A1* | 6/2013 | Beliveau | H04L 67/327 | 370/235 |
| 2013/0163427 A1* | 6/2013 | Beliveau | H04L 67/327 | 370/235 |
| 2013/0163475 A1* | 6/2013 | Beliveau | H04L 67/327 | 370/257 |
| 2013/0246698 A1* | 9/2013 | Estan | G11C 7/1072 | 711/108 |
| 2014/0050002 A1* | 2/2014 | Sun | G11C 15/00 | 365/49.1 |
| 2014/0095782 A1* | 4/2014 | Koktan | H04L 45/60 | 711/108 |
| 2014/0204948 A1* | 7/2014 | Beliveau | H04L 67/327 | 370/392 |
| 2014/0269717 A1* | 9/2014 | Thubert | H04L 63/1416 | 370/392 |
| 2015/0195206 A1* | 7/2015 | Memon | H04L 47/10 | 370/235 |
| 2015/0341269 A1* | 11/2015 | Basso | H04L 63/101 | 370/392 |
| 2016/0127237 A1* | 5/2016 | Vavili | H04L 45/745 | 370/474 |
| 2016/0134537 A1* | 5/2016 | Huynh | H04L 45/7457 | 709/238 |
| 2016/0255087 A1* | 9/2016 | Smith | G06F 21/6218 | 726/1 |
| 2018/0191683 A1* | 7/2018 | Wighe | H04L 63/0263 | |

* cited by examiner

ACCESS CONTROL BASED ON RANGE-MATCHING

BACKGROUND

Network devices (such as routers, switches, etc.) are commonly used to transport network data packets within a computer network. Each network device can, while transporting network data packet, make various determinations for each network data packet. For example, a network device can determine, for each received network data packet, appropriate action(s) to perform on the network data packet. Respective actions for a given network data packet may be determined using action control list(s) that may include different types of actions. Actions can include, for example, dropping packets, quarantining packets, cloning packets, etc. The network device can include rule(s) for selecting certain action(s) for received network data packet(s). Organization and implementation of these rules and actions can impact the network device's ability to efficiently maneuver, restrict and control the flow of certain network data packets.

BRIEF DESCRIPTION OF THE DRAWINGS

Various embodiments in accordance with the present disclosure will be described with reference to the drawings, in which.

DETAILED DESCRIPTION

Figure 1:
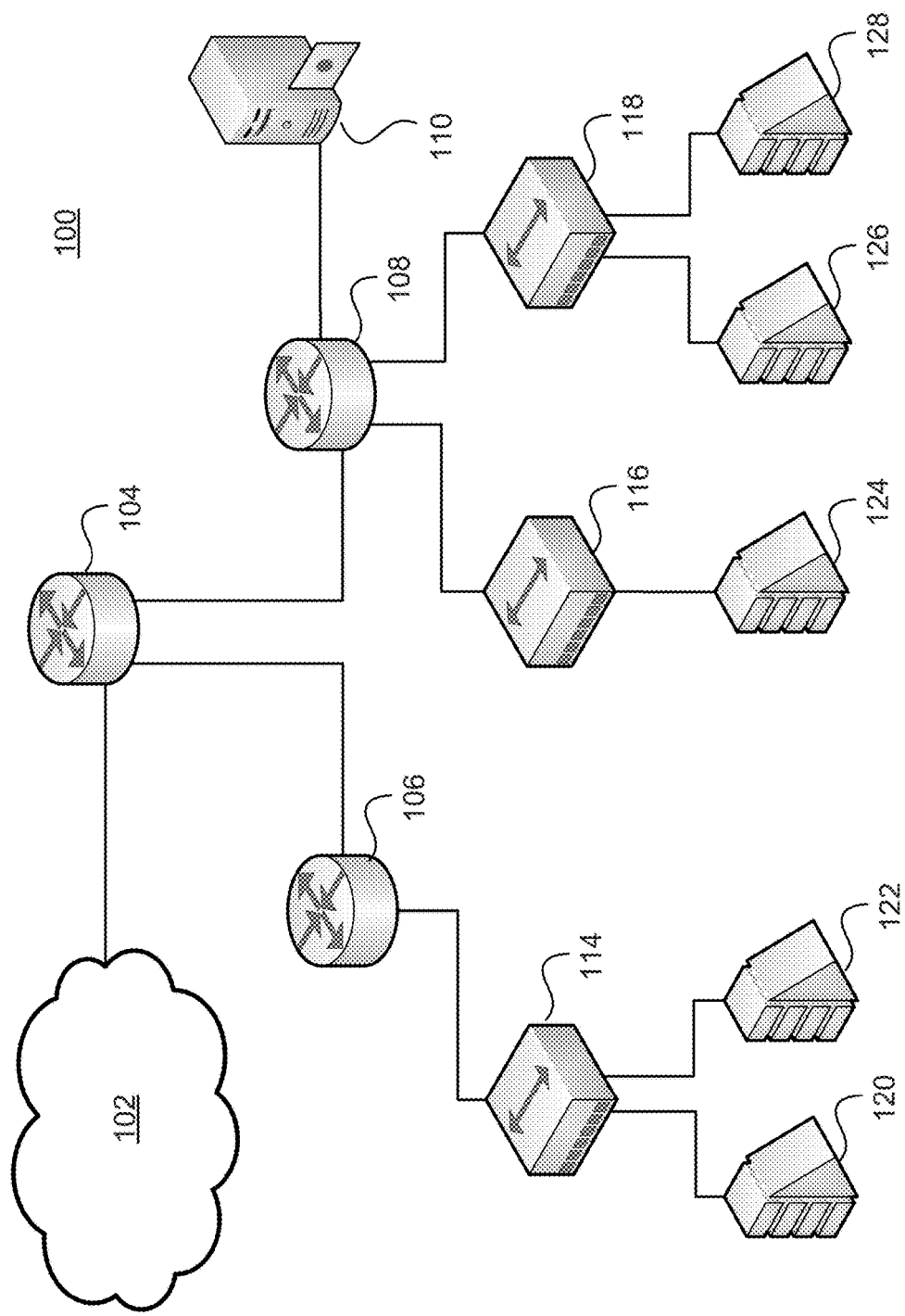
FIG. 1 illustrates an example network architecture that may utilize features of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Disclosed are techniques that can be used by a network device to efficiently locate, select, and/or rank various actions that can be performed by the network device on received network data packet(s). The actions can be located through the use of one or more action control lists. An action control list can include a plurality of action control entries. When a network data packet is received by a network device, one or more fields of the network data packet can be parsed and/or adapted for searching within action control list(s). For example, certain source or destination address(es) can be selected such that a certain action is performed on network data packet(s) received with the certain source or destination address(es). If a corresponding action control entry is located, one or more actions may be performed on the network data packet(s).

As one possible use case scenario, a network device can be a network switch or router on an edge of a network. Using the action control lists, only network data packets received by the network device with destination addresses within the network may be accepted and allowed to enter the network. Other network data packets may be dropped in order to relieve network traffic or prevent unauthorized network breaches. Therefore, a network data packet dropping action can be assigned to network data packets having destination addresses that are outside of destination addresses within the network.

Selecting the action can include locating an appropriate access control entry within an access control list. The access control entry can correspond to an action of dropping a network data packet, for example. For a given network data packet, multiple fields and/or values of fields can correspond to certain sometimes differing actions. For a given network data packet, several different actions may be determined as being possible actions to ultimately be performed on the network data packet. The different actions may be ranked or otherwise down-selected to ultimately select an action to be performed on the network data packet.

For example, one technique for locating certain actions to perform on a network data packet can utilize content-addressable memory (CAM). CAM is a type of physical electronic memory. Unlike traditional memory, wherein a memory address is used to select a location within the memory for a data value to be written to or read from, CAM can be provided a data value and, if the data value is stored within the CAM, a corresponding index (or memory address) of the data value location can be output. CAM is also known as associative memory, associative storage, or an associative array. An index output by a CAM can also be used as an index or a key for locating certain actions to be performed on a network data packet. An example of a data value that can be used to perform a match in a CAM may be an address (IP destination, source, port, etc.) extracted from a received network data packet. Upon a successful match of the data value against the CAM entries, the CAM can generate an index (or memory address) for the matching entry that can be further used to select certain actions (e.g., dropping of the network data packet) associated with the network data packet. Thus, CAM can be used as part of an access control system for a network device.

Depending on an implementation of CAM for use in accesses control of a network device, one index may be returned for one data value. Furthermore, multiple data values may be extracted or generated from one received network data packet, which may each correspond to a respective index returned by CAM. Each index may be used to select a corresponding possible action that may be performed on a network data packet. Determining which specific action to perform on a network data packet may require several different CAM lookups and/or prioritization between indexes or actions, especially when multiple different combinations of data values are used for action selection. The several different CAM lookup and/or prioritizations may lead to relatively complex access control schemas which may be difficult or time consuming to implement. Additionally, the several different CAM lookup and/or prioritizations may require correspondingly complex circuitry which may incur additional device cost and/or additional device power usage.

Disclosed are techniques that can be used to efficiently implement access control systems using CAM. The techniques can include assembling a key for searching within CAM memory. The key can include an array (e.g., a bit vector, bitmap, or bit array) such that each element or bit in the array can correspond to a range of values. The range of values can be, for example, a port number, IP address, length of a network data packet, or a range of values stored within a user-defined field of a network data packet. Using techniques disclosed herein, an action can be assigned to a range of values as opposed to each individual value within the range. Furthermore, various combinations of ranges can be matched against a single key. For example, various logical unions or intersections of ranges can be combined within a single key and searched in the CAM for a corresponding matching entry to ultimately locate an action to perform on a network data packet having a field falling within the various logical unions or intersections of ranges.

For example, one field can correspond to a range of source IP addresses. Another field can correspond to a range of packet lengths. Using techniques disclosed herein, a single key can be generated for a network data packet to encode the network data packet's length and source address. The single key can be used to determine an action to perform on the network data packet if, for example, the source IP address is within the range of source IP addresses and the length of the packet is within the range of packet lengths.

Using the disclosed techniques, various combinations of matches on fields of a network data packet and/or on fields within metadata associated with a network data packet can be accomplished using a single key. By combining combinations of matches to values of field(s) using the disclosed logical operators (e.g., unions and intersections), relatively complex matching criteria can be encoded using a single key to be matched to a single entry of CAM. A relatively high level of control can be obtained for matching on network data packets using the disclosed techniques while minimizing required hardware and/or processing resources. For example, instead of using multiple matching keys/criteria/CAM entries, a single key can be matched to a single entry of CAM to determine if several matching criteria are met. Systems FIG. 1 illustrates an example computer network 100. Computer network 100 can be coupled to a secondary computer network 102 via network router 104. Network router 104 can be referred to as an edge router. Secondary computer network 102 can include a similar edge router or other components as computer network 100. Computer network 100 includes various components such as routers (104-108), switches (114-118), or servers (110 and 120-128). The components of computer network 100 can be arranged in various topologies.

Network data packets (not shown) can be transferred between various servers (or other hardware devices coupled to computer network 100). For example, network data packet(s) can be transferred from server 120, through switch 114, to server 122. Upon receiving the network data packet(s), switch 114 may make a determination if one or more actions should be performed on the network data packet(s). For example, an access control list can be used to determine, using one or more action control entries contained therein, the one or more actions for a network data packet. The access control list can be implemented using CAM, for example. Using the access control list, certain network data packet(s) can be dropped, forwarded, mirrored, have a corresponding priority altered, etc. Similarly, server 120 can transmit network data packet(s) to server 128 via switch 114, router 106, router 104, router 108, and switch 118. Each of switch 114, router 106, router 104, router 108, and switch 118 may include therein an access control list and may perform one or more actions on received network data packets.

Furthermore, server 120 may transmit network data packet(s) to a network device within or through secondary computer network 102. For example, secondary computer network 102 can represent the internet. Server 120 may transmit network data packets via switch 114, router 106, and through router 104 to secondary computer network 102. Servers 110 and 120-128 may also have contained therein an access control list implemented via CAM to select one or more actions to perform on received network data packet(s).

Figure 2:
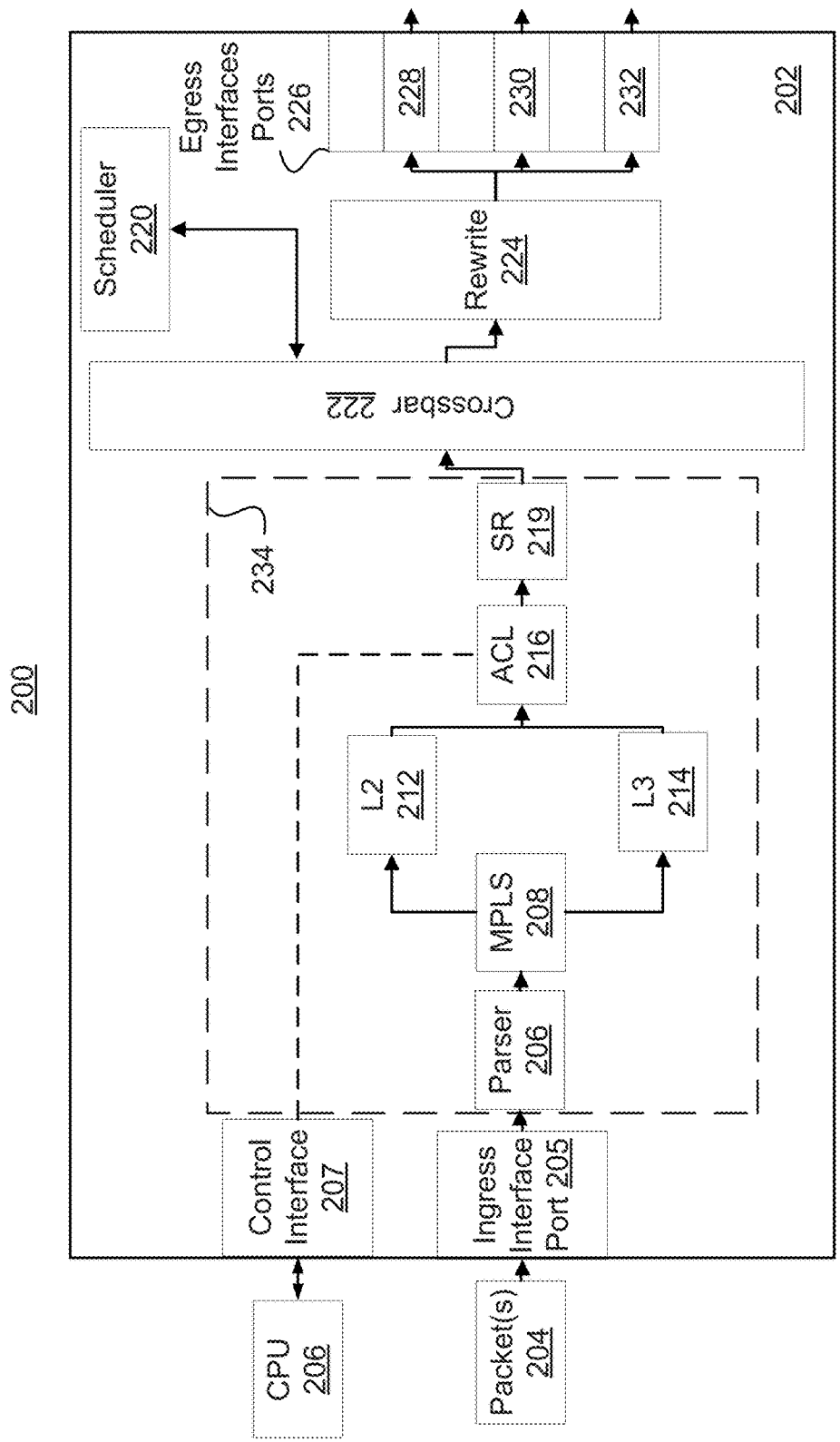
FIG. 2 illustrates an example network device that may be utilized within the network architecture of FIG. 1 and may utilize features of the disclosure.

FIG. 2 illustrates a logical block diagram of an example system 200 illustrating techniques for processing and forwarding of network data packets. System 200 can include network device 202 with packet processor 234. Functionality of packet processor 234 can be implemented using pipelined stages. Pipelining can support a packet processor's capabilities to process network data packets that support high-speed network data transfer operations, including forwarding information, lookups, and other packet processing operations.

Network device 202 can interact with a central processing unit (CPU) 206 via control interface 207. CPU 206 can include one or more x86 or ARM processors, a programmable logic device (PLD), or other logic circuitry. Although not illustrated, control interface 207 can interact with various modules of network device 202 (such as modules 208, 212, 214, 216, 219, and/or 220). Note that control interface 207 can be implemented within an interface port, similar to ingress interface port 205. For example, network data packets can be received over a same physical interface as network control packets from CPU 206. The network data packets can then be sorted to differentiate between network data and network control packets. The network control packets can be received, via a control plane, from CPU 206. The network data packets can be routed or forwarded by network device 202. CPU 206 can modify operation of network device 202 using a network control packet transmitted via the control plane.

Network data packet(s) 204 can be received via a network interface, such as ingress interface port 205. Ingress interface port 205 can provide a physical layer (PHY) interface. A Media Access Control (MAC) layer interface can be implemented via ingress interface port 205. Network data packet(s) 204 can be analyzed to detect a valid network data packet flow and segment the flow into datagrams (e.g., packets/frames). For instance, the PHY layer may receive and transmit data across physical connections (e.g., such as electrical signals received over twisted-pair coaxial cable or optical signals received over optical fiber). The PHY layer may implement different techniques dependent on the speed or type of network interface configuration (e.g., Ethernet 10 base-T, 100 base-TX, and 100 base-T forms), such as encoding, multiplexing, synchronization, clock recovery, and/or data serialization. Various signaling standards, such as IEEE 802.2, may govern the performance of the PHY layer consistent with the open systems interconnection (OSI) model for communications. The MAC layer may delimit frames and packets from the flow of data. Error checking may also be implemented at the MAC layer, checking for different errors, such as frame check sequence (FCS), interframe gap enforcement, and frame preambles.

Packet parser 206 can receive network data packets and separate a packet header from a packet payload and/or generate metadata. Packet parser 206 can parse header information (e.g., one or more packet headers) to determine and/or extract data for making forwarding decisions for the packet. For example, packet parser 206 can extract different layer headers (e.g., L2 and L3 headers) included in an Internet protocol (IP) version 4 packet, such as the source MAC address, the destination MAC address, the source IP address, the destination IP address, and port numbers. Using information from the layer headers, the network data packets can be forwarded to Multiprotocol Label Switching (MPLS) module 208. MPLS module 208 can use MPLS techniques to make forwarding decisions based on information in the header. In certain cases, an MPLS tunnel can be exited and packets can be forwarded based on L2 or L3 routing decisions respectively at L2 forwarding module 212 or L3 routing module 214. In certain instances, network data packets may pass through certain logical blocks or stages of the packet processor 234 without being processed. For example, if the network data packet received at the MPLS module 208 does not have an MPLS header, the MPLS module 208 may merely pass the packet through to the next block/stage of the packet processor 234.

Packet parser 206 (or MPLS module, L2 forwarding module 212, L3 routing module 214, ACL module 216, or other module(s)) can also generate metadata corresponding to packet(s) 204. The metadata may be used internal to network device 202 to determine routing decisions and/or to aid in testing operations, for example. The metadata can include port information, time information, unique packet identifier(s), packet length(s), etc. The metadata can be routed to one or more logic blocks of device 202.

A network data packet can be forwarded to L2 forwarding module 212 or L3 routing module 214 in order to determine forwarding and routing decisions based on information in the packet header (e.g., packet metadata) extracted by packet parser 206. For example, L2 forwarding module 212 can locate appropriate forwarding information through the use of Forwarding Table(s). Forwarding Table(s) can, in certain embodiments, be logically partitioned within L2 forwarding module 212. L2 forwarding module 212 can perform lookups for data in layer 2 (L2) portions of the packet to perform L2 forwarding. L2 forwarding may access a MAC address table in forwarding tables (not shown) to perform two lookups (which may be in parallel or in series). The first lookup may be performed with a key extracted from the packet header at packet parser 206 (e.g., a VLAN and source MAC address), to determine whether an entry for the packet is present in Forwarding Table(s). If the source MAC address is unknown, then a mapping determination may be made to map the source MAC address to a port identified in the packet header. If the MAC address is known but attached to a different port than indicated by the MAC address table, then an operation may be performed to move the source MAC address to the port identified in the packet header. Otherwise, the MAC address is known in the MAC address table. Another lookup to the MAC address table may also be performed at another key (the VLAN and the destination MAC address). The network data packet may be forwarded if the MAC address table contains an entry for the destination MAC address owned by a network device (otherwise other operations may be performed, such as trapping the network data packet for the CPU, bridging the packet to a certain interface, or flooding out of all ports and a spanning tree protocol (STP) forwarding state).

L3 routing module 214 can perform lookups for data in layer 3 (L3) portions of the packet to perform L3 routing. For example, IP headers for the packet may be evaluated with respect to entries and tables such as a routing or next hop table, to determine routing to be performed. The previous examples of packet processing are not exhaustive, as many other forwarding techniques may be employed, including, but not limited to, spanning tree protocol (STP) state checking, access port VLAN handling, VLAN membership checking, MAC2ME lookup, broadcast/multicast forwarding to a host CPU for the switch, tunnel start/termination lookup, longest prefix match, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and/or various other destination resolution lookups. As a packet processor 234 makes forwarding decisions about a network data packet, the decisions can be maintained as part of the packet metadata. The packet metadata can be provided to scheduler 220 for scheduling determinations.

Forwarding Table(s) may be implemented in one or multiple types of storage elements, such as various memory elements (e.g., a CAM, such as TCAM, and/or random access memory) to store table data for performing different forwarding decisions. Forwarding Table(s) may include a VLAN table, MAC address table, routing table, adjacency table, next hop table, tunnel start table, virtual routing and forwarding identifier table, tunnel termination table, and/or actions table. Each of these different tables may be utilized to retrieve or determine packet forwarding decisions, tunneling decisions, and associated modifications that may need to be made to network data packets.

Access Control List (ACL) module 216 can, based on rules, compare information obtained from a network data packet header or elsewhere to make a determination if the network data packet header is allowed to be directed to specific destination(s). For example, ACL module 216 can include a list of source address(es) of network data packets that are allowed to be forwarded to certain address(es). ACL module 216 can also include a list of source address(es) of network data packets that are not allowed to be forwarded to certain address(es). Additional information can be included within ACL module 216 such as protocol version(s), identifying information, or other information. As disclosed herein, ACL module 216 can include various access control list(s) that may be implemented using CAM. The access control lists(s) can be used to select one or more entries within the access control list(s) and corresponding actions to be performed on network data packets. In certain embodiments, actions can include preventing network data packets from being output by network device 202. Aspects of the ACL module 216 is discussed in more detail in FIGS. 3-5.

Network device 202 can include a plurality of packet processors, such as packet processors 234. The packet processors can each have similar capabilities and enable network device 202 to concurrently process a plurality of sequences of network data packets received at respective ports. As illustrated, a particular sequence of network data packets can be processed by packet processor 234 and a corresponding one of egress interface ports 226 selected for output of the particular sequence of packets. Interface ports 205 and/or 207 can be included within egress interface ports 226. Thus, each port of network device 202 may be used to input or output network data packet(s) as needed. Although not illustrated, packet processor 235 can include logic blocks that correspond to the logic blocks of packet processor 234. Furthermore, packet processor 235 may correspond to test logic 219 that can be similar to test logic 218.

Scheduler 220 can control the buffering of packets and scheduling of operations within the network device 202. For example, scheduler 220 can implement a memory management unit to allocate available memory segments for buffering stored packets. Scheduler 220 can also implement a memory management unit to allocate packets from a buffer for final processing and egress. Scheduler 220 can be provided with appropriate metadata for a packet to determine, for example, a destination port for the packet and/or relative priority of the packet. Once a network data packet has been scheduled, scheduler 220 can utilize crossbar 222, PHY interface, and/or a MAC layer interface to transmit network data packets. Rewrite module 224 can be used to rewrite encapsulation or other information after a packet has traversed crossbar 222. The rewrite module 224 can rewrite fields in the packet to, for example, enter or exit a tunnel, modify Quality of Service (QoS) parameters, or update a next-hop address. Any of egress interface ports 226 (including ports 228, 230, and 232) can be used to output the packet from network device 202 after the packet has been acted upon by rewrite module 224. Egress interface ports 226 can include a PHY interface and/or a MAC interface.

Figure 3:
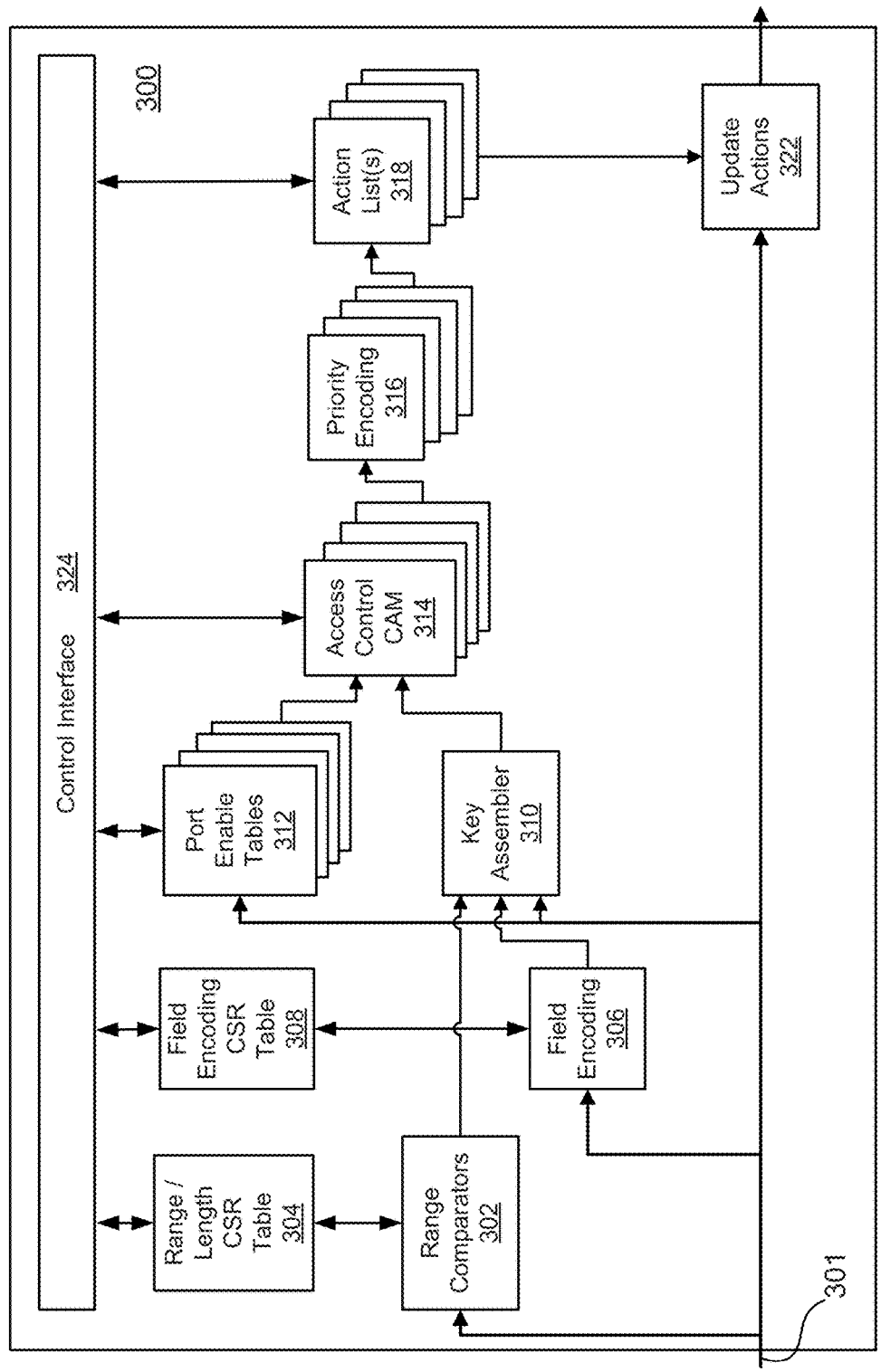
FIG. 3 illustrates an example access control list module that may be utilized within the network device of FIG. 2 and may utilize features of the disclosure.

FIG. 3 illustrates an example ACL module 300 that can be similar to ACL module 216 within processing pipeline 234. ACL module 300 can receive network data packet information and/or metadata utilizing bus 301. Network data packet information and/or metadata can be extracted and/or generated for network data packets by parser 206, for example. Range comparators 302 can receive one or more values of fields from network data packets that can include port(s), destination address(es), source address(es), length(s), etc. alone or in any combination. Table 1 includes various example fields that can be employed for using the techniques disclosed herein. For example, layer L1 fields of the ingress port or output port can be range matched using the disclosed techniques. Further examples include the Destination MAC Address field of L2, Source IP Address, Destination IP Address, and TTL fields of L3, and the Source and Destination Port fields of L4. Furthermore, one or more metadata fields can be used as well, such as a packet length.

Range comparators 302 can compare data stored within any of the fields (such as those listed in Table 1 and/or residing within metadata) to corresponding register value(s) within Range/Length CSR Table 304. Range/Length CSR Table 304 can include a plurality of control/status registers that can be populated by CPU 206, for example, using control interface 324. Control interface 324 can be similar to control interface 207. The control/status registers of Range/Length CSR Table 304 can each include, for example, a maximum value or a minimum value of a range. Range Comparators 302 can include logic to generate, for example, a corresponding high bit value if a field is within a corresponding range of values stored within Range/Length CSR Table 304 or a low bit value otherwise. In certain embodiments, Range comparators 302 logic can generate two separate bit values, one set corresponding to, for example, whether a compared value is greater than or equal to a minimum value stored in Range/Length CSR Table 304 and the other set corresponding to whether a compared value is less than or equal to a maximum value stored in Range/Length CSR Table 304.

TABLE 1

Example IP Fields

| Layer | Field |
|---|---|
| L1 | Ingress Port |
|  | Egress Port |
| L2 | Destination MAC Address |
|  | Ethertype |
| L3 | Source IP Address |
|  | Destination IP Address |
|  | IP Protocol |
|  | IP fragmentation number |
|  | Time-to-Live/TTL |
| L4 | Source Port |
|  | Destination Port |
|  | TCP Flag(s) (e.g., CWR - Congestion Window Reduced; ECE - Explicit Congestion Notification echo; URG - Urgent; ACK - Acknowledgement; PSH - Push; RST - Reset; SYN - Synchronize; FIN - Finished) |

Field encoding 306 can similarly be used to encode various fields of network data packet information or metadata in a compressed format. For example, an eight bit IP protocol value can be encoded into a four bit value. Field encoding CSR table 308 can include various values stored within to support field encoding, such as a list of compressed values that can be substituted in place of a value of a field of network data packet information or metadata. Key assembler 310 can combine output generated by range comparators 302 (such as bit(s) indicating whether certain values of fields of network data packet information or metadata are within, or not within, certain ranges or whether the packet length is below or above a certain threshold length) and output generated by field encoding 306 (such as compressed field value(s)) into a key that can be provided to Access Control CAM 314. Range Comparators 302 and key assembler 310 can be referred to as key assembler circuitry.

Access Control CAM 314 can be used to implement a plurality of access control lists that can each be individually searchable. Each access control list can correspond to a portion of logic of ACL module 300 known as a slice. Each slice can be used to implement an access control list (with corresponding CAM, an encoder, and/or an action memory table). In certain embodiments, a slice can include a certain portion of CAM for locating corresponding access control entries stored therein. For example, a single slice can refer to a portion of CAM having a set number of access control entries stored therein. A double slice can refer to a portion of CAM having a set number of access control entries being double of a single slice (e.g., a double slice may include two single slices). Access control entries of double slices can be larger than access control entries for single slices, enabling additional match criteria for a key. A single slice can support IPv4 network packets and a double slice can support IPv6 network packets (to account for additional address ranges/fields of IPv6 network packets). A key used for searching within a single slice may also be of a first size (number of bits) whereas a key used to search a double slice may be a second size (e.g., twice the number of bits of the first size). In certain embodiments, a CAM can implement a number of slices of differing sizes. The access control entries may be swapped between (single or double) slices in order to expeditiously update matching criteria, for example, via a command from a CPU via control interface 324. Furthermore, each slice may be individually enabled or disabled to allow certain slices to participate in matching. As one example, a register can determine a priority of slices to be used for matching and/or to enable/disable certain slice(s). For example, a first slice may be loaded with a set of match control entries. A second slice may be loaded with a second set of match control entries. By changing a value of the register (such as by a CPU via control interface 324), the first or second slice by interchangeably enabled or disabled, thus allowing atomic swapping of slices between subsequent CAM matching operations.

In certain embodiments, a field of a key can be used in a multiplexed manner. Multiplexing, as used herein, indicates that a field of a key can be interpreted in several different ways. For example, a field of a key can be interpreted as corresponding to an attribute of a range of IP addresses or an attribute of a range of port numbers. In certain embodiments, key assembler 310 may assembly several keys for a same network data packet using multiplexing techniques. One of the keys may include a field populated by a first value indicating a corresponding IP address of the network data packet. Another of the keys may populated the same field with a second value indicating a port that the network data packet was received on. In certain embodiments, a corresponding slice or portion of Access Control CAM 314 may be searched utilizing a corresponding key. Each slice or portion may include access control entries corresponding to a key and, more specifically, with access control entries corresponding to the attribute that the field is selected as being interpreted as. In certain embodiments, a value of a field may be interpreted as corresponding to a respective one of several attributes and may be searched within a respective slice or portion of Access Control CAM 314.

Each access control list can also correspond to a port enable table of Port Enable Tables 312. Each port enable table can include a vector corresponding to a respective Access Control CAM 314 slice. The vector can be used to enable or disable certain port(s) for use in matching to a key within a slice. For example, network device 202 can include a variety of port interfaces (including 205, 228, 230, and 232) that can each be used as an ingress or an egress (logical or physical) port. Network device 202 can be configured to only check if network data packets received via certain interface ports are to be compared to specific access control entries of a slice of Access Control CAM 314. Port enable table 312 provides flexibility in matching by, for example, enabling matching of any port of network device 202 with any access control entry of a slice of Access Control CAM 314. In certain embodiments, each port can be flagged for determination as to which access control entries are to be utilized for locating an action to be performed, via an ACL, on a network packet received or to be transmitted via the corresponding port.

Each slice of Access Control CAM 314 can provide corresponding one or more indexes (or address(es)) if the key matches an entry found within the Access Control CAM 314. Priority Encoding 316 can be configured to rank resulting address(es) such that certain indexes, actions or slices take precedence over others. In certain embodiments, priority encoding 316 can remove certain lower priority address(es) provided by Action Control CAM 314 to minimize the number of actions to be performed on a network data packet (such as by determining one action to be performed). Prioritization can occur between indexes obtained from multiple slices or indexes obtained from within a single slice. The disclosed architecture can provide flexibility by enabling various combinations of access control lists to be searched and various combinations of ranges to be searched within each access control list.

In certain embodiments, Access Control CAM 314 can utilize Ternary CAM (TCAM) which can accept one of three different values for each bit to be searched therein. The values can be a logic high (a "1"), a logic low (a "0"), or a wildcard (an "x"). TCAM can provide greater flexibility in matching to a key by, for example, enabling wildcard matching. Table 2 illustrates an example key that can be provided to Access Control CAM 314. Table 2 can correspond to a key that corresponds to a logical representation of K∈Range[i], wherein i corresponds to a range of values. Each TCAM value can correspond to a range of values (e.g., a range of TPC/IP addresses, ports, packet lengths, etc.) The value can be a bit, as illustrated, or an element of an array. Each of the TCAM values can be set by a CPU via Control interface 324, for example.

TABLE 2

Example Inclusive Key and TCAM

| TCAM Value | 31 | 30 | ... | i | ... | 1 | 0 |
|---|---|---|---|---|---|---|---|
| Key | x | x | x | 1 | x | x | x |

Table 3 can correspond to a key that corresponds to a logic representation of K∉Range[j], wherein j corresponds to a range of values.

TABLE 3

Example Exclusive Key and TCAM

| TCAM Value | 31 | 30 | ... | j | ... | 1 | 0 |
|---|---|---|---|---|---|---|---|
| Key | x | x | x | 0 | x | x | x |

Table 4 can correspond to a key that corresponds to a logic representation of K∈(Range[i]∩Range[j]∩Range[m]∩Range[n]), wherein i, j, m, and n each corresponds to a range of values

TABLE 4

Example Complex Union Key and TCAM

| TCAM Value | 31 | 30 | ... | i | j | ... | m | n | ... | 1 | 0 |
|---|---|---|---|---|---|---|---|---|---|---|---|
| Key | x | x | x | 1 | 1 | x | 1 | 1 | x | x | x |

Table 5 can correspond to a key that corresponds to a logic representation K∉(Range[m]∪Range[n]), wherein m and n each corresponds to a range of values.

TABLE 5

Example Exclusive Key and TCAM

| TCAM Value | 31 | 30 | ... | m | n | ... | 1 | 0 |
|---|---|---|---|---|---|---|---|---|
| Key | x | x | x | 0 | 0 | x | x | x |

Table 6 can correspond to a key that corresponds to a logic representation of K∈(Range[i]∩Range[j]), and K∉(Range[m]∪Range[n]), wherein i, j, m, and n each corresponds to a range of values.

TABLE 6

Example Complex Mixed Key and TCAM

| TCAM Value | 31 | 30 | ... | i | j | ... | m | n | ... | 1 | 0 |
|---|---|---|---|---|---|---|---|---|---|---|---|
| Key | x | x | x | 1 | 1 | x | 0 | 0 | x | x | x |

As should be understood from the preceding examples, a multitude of differing combinations of ranges of values can be searched and/or encoded into a single key. The single key can be used to search for corresponding actions to be performed on a network data packet. The single key can include various combinations of unions, intersections, and other logical operations between ranges of values. Thus, a single key matching an entry of CAM can indicate that a various criteria (and logical operations of the criteria) are met instead of, for example, checking individually if each of the criteria is met. Thus, relatively high granularity matching criteria can be implemented using minimal memory space, power, and/or computational cycles.

In summary, Range/Length CSR Table 304, Field Encoding SCR Table 308, Port Enable Tables 312, Access Control CAM 314, and Action List(s) 318 can be populated via a CPU utilizing Control Interface 324. ACL module 300 can receive network data packets and/or metadata corresponding to the network data packets via bus 301. Range Comparators 302 can compare field(s) of network data packet(s) or metadata to Range/Length SCR Table 304 to determine if values of respective fields fall within respective ranges. Depending on results of the matching, Key Assembler 310 can generate a key that is compared to entries within Access Control CAM 314. If a match if located, an index of Access Control CAM 314 corresponding to the match can be used to locate a corresponding action within Action List(s) 318.

Action List(s) 318 can include a plurality of actions organized into table(s). The prioritized address(es) can be used as indexes into one or more tables of action list(s) 318. For example, an action list can correspond to a slice of Access control CAM 314. Each slice can be used to determine an action to be performed on a received network data packet. Example actions include dropping a packet, forwarding a packet to a CPU for further processing (possibly with a corresponding code), setting a class of a packet, setting a priority of a packet, setting a priority of the packet, assigning a code to the packet used for troubleshooting/identification of the packet, mirroring the packet, a differentiated services code point, a forwarding address for the packet, a forwarding group for the packet, setting a quality of service parameter for the packet, setting a routing policy for the network packet, or enabling policing for the network packet. Update Actions 322 can be used to implement an action selected from Action List(s) 318 so that the actions are to be performed on a corresponding network data packet. For example, Update Actions 322 can modify metadata corresponding to the network data packet and provide the metadata to a module of a packet processor of which ACL module 300 is included, such as a module of packet processor 234. Priority encoding 316 can be included within action control circuitry that can be further used to provide to and receive data from Access Control CAM 314, select an action from Action List(s) 318, and/or update actions to be performed on a network packet vs Update Actions 322.

Control interface 324 can be used to, for example, populate Range/Length CSR Table 304, Field Encoding CSR Table 308, Ingress Port Enable Tables 312, Access Control CAM 314, and/or Action List(s) 318 by a CPU (such as CPU 206). By populating the various modules of ACL module 300, the actions to be performed for certain received network data packets can be altered or otherwise updated. For example, Range/Length CSR Table 304 can be configured to perform a variety of logic relations between ranges/lengths of data values corresponding to network packets received by a network device. A CPU can populate range(s) within Range/Length CSR Table 304 such that a specific field of a key generated as a result of comparisons to the range(s) is set depending if a value is within the range(s). Furthermore, entries within Access Control CAM 314 can be populated by the CPU such that a specific action can be selected deepening on whether the value is within the range(s). Similarly, action list(s) 318 can be populated by the CPU with actions to perform on network data packets in response to the generated key matching an entry within Access Control CAM 314. For example, an index of a matching entry can be used to selection an action from action list(s) 318.

Figure 4:
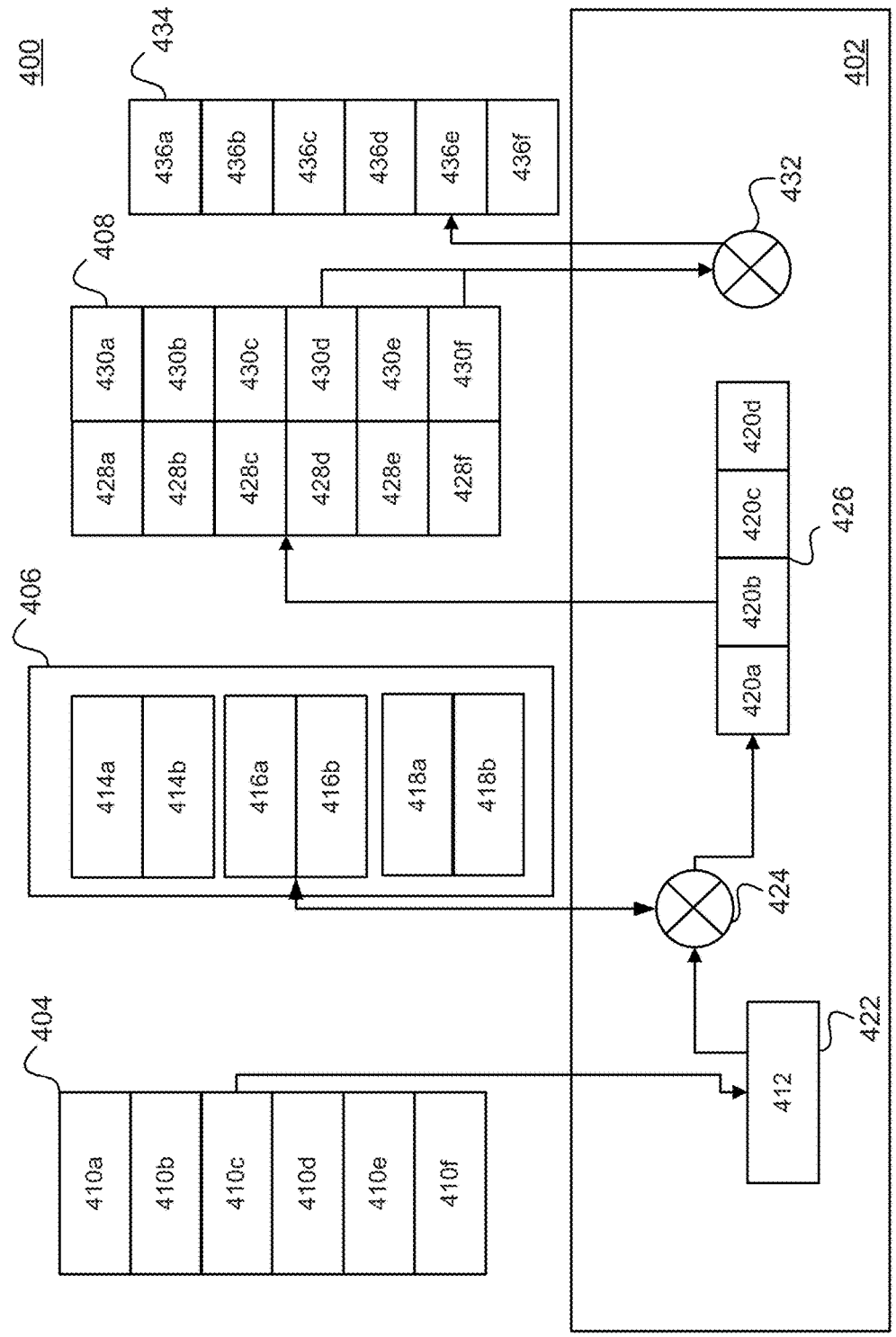
FIG. 4 illustrates an example logic diagram of an access control list module that may utilize features of the disclosure.

FIG. 4 illustrates an example logic representation of ACL logic according to certain embodiments. Illustrated is a system 400 that can include ACL module 402. System 400 can be similar to network device 202. ACL module 402 can be similar to ACL module 300. System 400 can receive network data packet information 404. Network data packet information 404 can represent network data packet information and/or metadata corresponding to one or more network data packets received by a network device. Network data packet information 404 can include fields 410a-410f. In certain embodiments, fields 410a-410f can correspond to the fields illustrated in Table 1. ACL module 402 can include a register or memory 422 to store a value stored within one of fields 410a-410f. As illustrated, a value stored within field 410c can be stored within register 422 as value 412. Key Assembler Logic 424 can be used to compare value 412 within one of several ranges stored within range/length registers 406.

Range/length registers 406 can be similar to range/length CSR table 304, for example. Each of element pairs 414a, 414b, 416a, 416b, and 418a, 418b can include minimum/maximum range values respectively. A determination can be made by Key Assembler Logic 424 to determine whether value 412 is within any of ranges stored within element pairs 414a, 414b, 416a, 416b, or 418a, 418b. As illustrated, range Key Assembler Logic 424 can determine that value 412 is within a range stored within element pair 416a, 416b. If so, Key Assembler Logic 424 can generate a key 426 with various fields (or bits) 420a-420d set to certain values. Each of fields 420a-420d can be set to indicate that a data value is within one of the ranges stored within a corresponding element pairs 414a, 414b, 416a, 416b, or 418a, 418b. For example, field 420b can be set to indicate that value 412 is within a range defined by elements pair 416a, 416b. For example, key 426 can include a bit array wherein 420a-420d can each represent a bit of the bit array. Each of 420a-420d can be populated based on respectively comparing value 412 to each of element pairs 414a, 414b, 416a, 416b, and 418a, 418b. For example, if value 412 is determined to be greater than or equal to a value stored in element 414a and less than or equal to a value stored in element 414b, then bit 420a may be set to a first value. Likewise, if value 412 is determined to be less than a value stored in element 414a or greater than a value stored in element 414b, then bit 420a may be set to a second value.

Access Control List Memory 408 can correspond to Access Control CAM 314. Key Assembler Logic 424 can provide key 426 to Access Control List Memory 408. Access Control List memory 408 can then determine if key 426 matches an Access Control Entry (data value) 428a-428f. As illustrated, key 426 may correspond to Access Control Entry 428e. If so, Access Control List Memory 408 may provide address 430e corresponding to Access Control Entry 428e to Action Control Logic 432. Action Control Logic 432 may utilize address 430d and/or 430f as possible index(es) into Action List 434. Action Control Logic 432 may prioritize between any of addresses 430a-430f to determine an index for use with Action List 434. Action List 434 can include a plurality of actions 436a-436f. As illustrated, address 430e may be an index corresponding to action 436e. Thus, action 436e may be selected to be performed on network data packet information 404. As disclosed herein, system 400 may include a plurality of action control lists corresponding to a plurality of action lists. As such, prioritization logic can further be implemented to select certain actions to be performed on network data packet information 404 when, for example, a plurality of matches are provided by the plurality of action control lists (a plurality of addresses can be provided and each used as an index to a corresponding action list).

Methods

Figure 5:
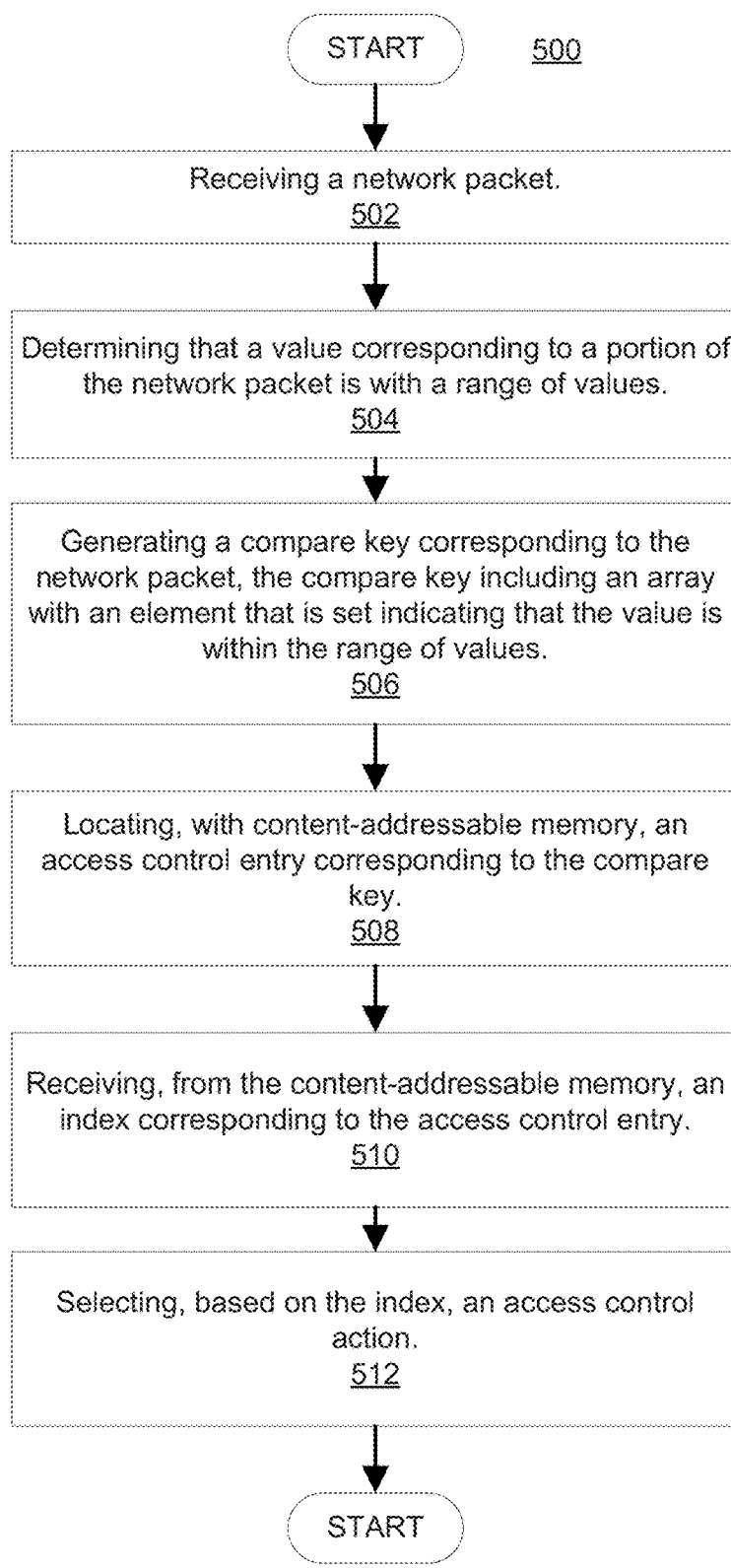
FIG. 5 illustrates a flowchart illustrating an example method for implementing features of the disclosure.

FIG. 5 illustrates a flowchart 500 for performing example methods for utilizing range matching for access control determination. These methods may be implemented by the systems described above, such as for example, systems 202, 300, or 400. The methods can be performed by a packet pipeline, processor, or other logic device(s) of a network device. At 502, a network packet can be received at a network device. For example, network packet(s) 204 can be received by network device 202. At 504, a determination can be made that a value corresponding to a portion of the network packet is within a range of values. For example, Range comparators 302 can determine that a value is within a range of values dictated by Range/Length CSR Table 304 and/or Key Assembler Logic 424 can determine that value 412 is within a range of values dictated by range/length registers 406.

At 506, a compare key can be generated that corresponds to the network packet. The compare key can include an array including an element that is set indicating that the value is within the range of values. For example, the key can correspond to a key generated by key assembler 310 or to Key Assembler Logic 424. At 508, an access control entry can be located within the CAM, the access control entry corresponding to the key. At 510, an index corresponding to the access control entry can be received. For example, Access Control CAM 314 may provide an address or index of an access control entry stored therein; or an address, one of 430a-430f, may be provided by Access Control List Memory 408. At 512, an access control action can be selected based on the index received from the CAM. For example, an action can be selected from Action List(s) 318 or Action List 434. The action can be an action to perform on the network packet received by the network device at 502. The selected action can then be performed on the network packet.

Computing Systems

Figure 6:
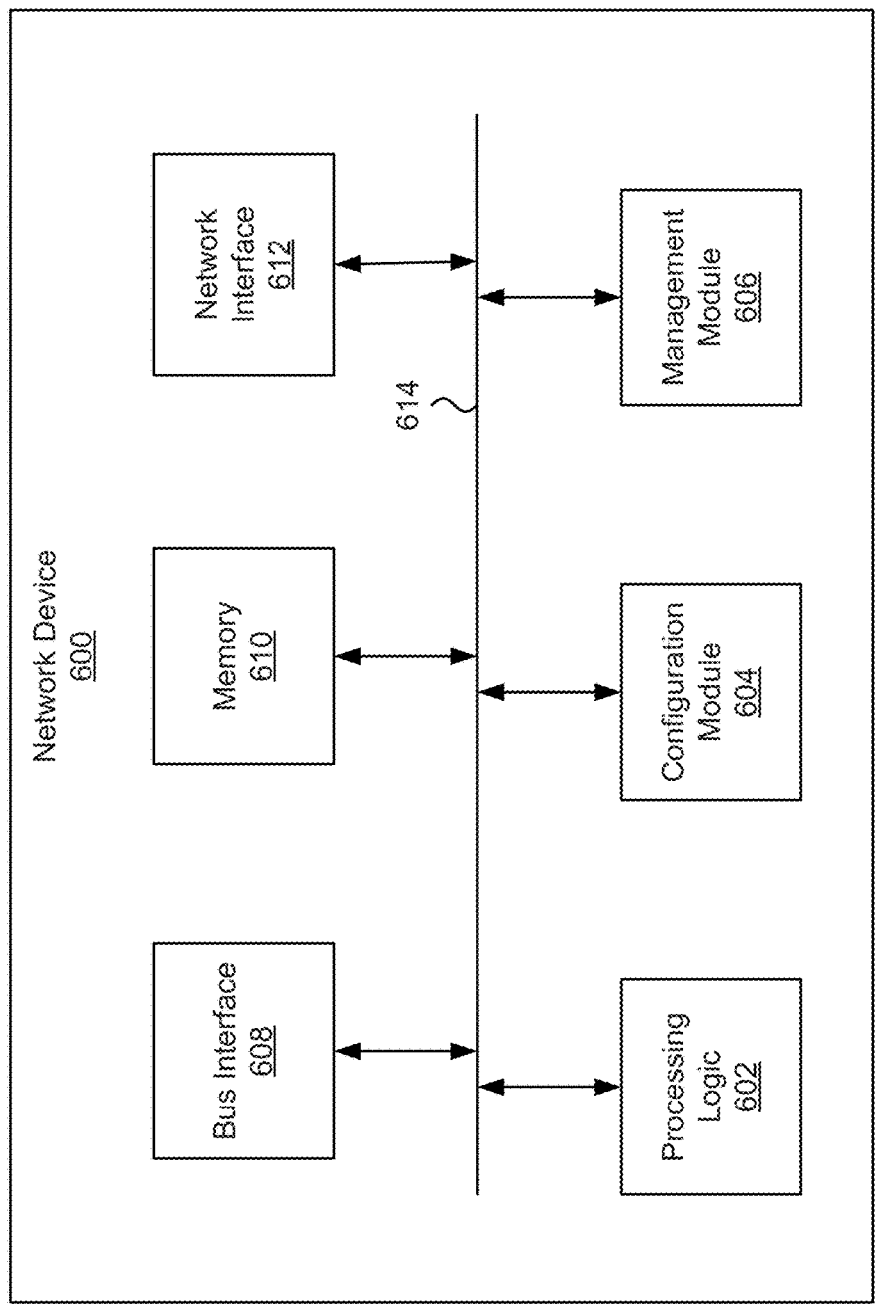
FIG. 6 illustrates an example of a network device, according to certain aspects of the disclosure.

FIG. 6 illustrates an example of a network device 600, which can be similar to network device 202 and include functionality of system 300 or 400. Functionality and/or several components of the network device 600 may be used without limitation with other embodiments disclosed elsewhere in this disclosure, without limitations. A network device 600 may facilitate processing of packets and/or forwarding of packets from the network device 600 to another device. As referred to herein, a "packet" or "network data packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 600 may be the recipient and/or generator of packets. In some implementations, the network device 600 may modify the contents of the packet before forwarding the packet to another device. The network device 600 may be a peripheral device coupled to another computer device, a switch, a router or any other suitable device enabled for receiving and forwarding packets.

In one example, the network device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The network device 600 may include additional modules, not illustrated here, such as components discussed with respect to the nodes disclosed in FIG. 7. In some implementations, the network device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software such as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the network device 600, while in other cases some or all of the memory may be external to the network device 600. The memory 610 may store an operating system comprising executable instructions that, when executed by the processing logic 602, provide the execution environment for executing instructions providing networking functionality for the network device 600. The memory may also store and maintain several data structures and routing tables for facilitating the functionality of the network device 600.

In some implementations, the configuration module 604 may include one or more configuration registers. Configuration registers may control the operations of the network device 600. In some implementations, one or more bits in the configuration register can represent certain capabilities of the network device 600. Configuration registers may be programmed by instructions executing in the processing logic 602, and/or by an external entity, such as a host device, an operating system executing on a host device, and/or a remote device. The configuration module 604 may further include hardware and/or software that controls the operations of the network device 600.

In some implementations, the management module 606 may be configured to manage different components of the network device 600. In some cases, the management module 606 may configure one or more bits in one or more configuration registers at power up, to enable or disable certain capabilities of the network device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the network device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 600 may include multiple network interface modules, each configured to communicate with a different network. For example, in these implementations, the network device 600 may include a network interface module for communicating with a wired Ethernet network, a wireless 802.11 network, a cellular network, an Infiniband network, etc.

The various components and modules of the network device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 7.

Figure 7:
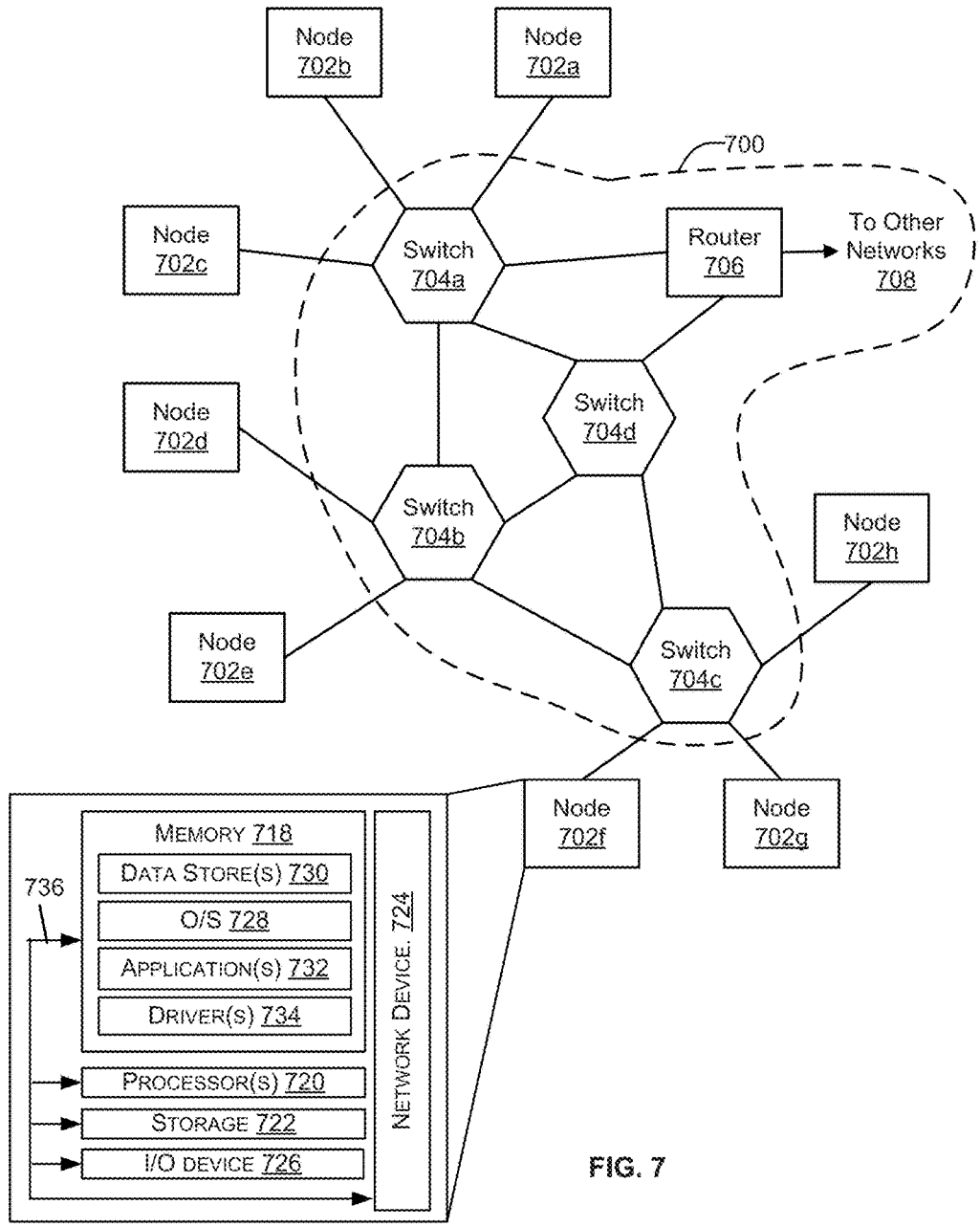
FIG. 7 illustrates an example architecture for features and systems described herein that includes one or more service provider computers and/or a user device connected via one or more networks, according to certain aspects of the disclosure.

FIG. 7 illustrates a network 700, illustrating various different types of network devices 600 of FIG. 6, such as nodes comprising the network device, switches and routers. In certain embodiments, the network 700 may be based on a switched architecture with point-to-point links. As illustrated in FIG. 7, the network 700 includes a plurality of switches 704a-704d, which may be arranged in a network. In some cases, the switches are arranged in a multi-layered network, such as a Clos network. A network device 600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 704a-704d may be connected to a plurality of nodes 702a-702h and provide multiple paths between any two nodes.

The network 700 may also include one or more network devices 600 for connection with other networks 708, such as other subnets, LANs, wide area networks (WANs), or the Internet, and may be referred to as routers 706. Routers use headers and forwarding tables to determine the best path for forwarding the packets, and use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704a-704d and router 706, if present, may be referred to as a switch fabric, a fabric, a network fabric, or simply a network. In the context of a computer network, the terms "fabric" and "network" may be used interchangeably herein.

Nodes 702a-702h may be any combination of host systems, processor nodes, storage subsystems, and I/O chassis that represent user devices, service provider computers or third party computers.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s) may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 702*a*-702*h* may include at least one memory 718 and one or more processing units (or processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the node(s) 702*a*-702*h*, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein.

The operating system 728 may support nodes 702*a*-702*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, network device 724, and/or I/O device 726. Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702*a*-702*h* or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702a-702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702a-702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702a-702h may also include I/O device(s) 726, such as a keyboard, a mouse, a pen, a voice input device, a touch input device, a display, speakers, a printer, and the like. The node(s) 702a-702h may also include one or more communication channels 736. A communication channel 736 may provide a medium over which the various components of the node(s) 702a-702h can communicate. The communication channel or channels 736 may take the form of a bus, a ring, a switching fabric, or a network.

The node(s) 702a-702h may also contain network device(s) 724 that allow the node(s) 702a-702h to communicate with a stored database, another computing device or server, user terminals and/or other devices on the network(s) 700. The network device(s) 724 of FIG. 7 may include similar components discussed with reference to the network device 600 of FIG. 6.

In some implementations, the network device 724 is a peripheral device, such as a PCI-based device. In these implementations, the network device 724 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 724 may be connected to a computing system using a PCIe interface.

A PCI-based device may include one or more functions. A "function" describes operations that may be provided by the network device 724. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 724 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6 and FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device, comprising:
   a register memory storing indications of a range of values;
   a content-addressable memory (CAM) comprising a plurality of portions, each portion comprising one or more access control entries;
   memory storing actions to take on network packets;
   key assembler circuitry coupled to the register memory and the CAM, the key assembler circuitry configured to:
   receive data for a network packet received by the network device, the data including fields;
   determine that a value of a first one of the fields is within a first numerical range;
   generate a compare key including a first field corresponding to the first numerical range and a second field corresponding to a second numerical range, a first value stored in the first field indicating that the value is within the first numerical range and a second value stored in the second field indicating that the value is not within the second numerical range, the compare key having a pre-determined size; and
   provide, to the CAM, the compare key to search for an access control entry in a number of portions of the plurality of portions of the CAM, the number of portions being based on the size of the compare key; and
   action control circuitry coupled to the CAM and the memory storing actions, the action control circuitry configured to:
   receive, from the CAM, an address of the access control entry found using the compare key;
   select, using the access control entry, from the memory, one of the actions to perform on the network packet; and
   perform the selected action on the network packet.

2. The network device of claim 1, wherein:
   the CAM includes slices, wherein each of the slices is a portion of the plurality of portions of CAM;
   the key assembly circuitry is configured to generate access control entries and provide each of the access control entries to a respective one of the slices;
   each of the slices is configured to generate a respective address of an access control entry stored therein;
   wherein the stored actions include sets of actions, each of the sets of actions corresponding to a respective one of the slices; and
   wherein the action control circuitry is configured to select, from each of the sets of actions, a respective action based on receiving, from the corresponding slice of the CAM, an address of an access control entry stored within the corresponding slice.

3. The network device of claim 1, wherein the register memory stores a plurality of ranges of values; and
   wherein the key assembler circuitry is configured to:
   determine that a value of a second one of the fields is within a second range of the plurality of ranges of values; and
   generate the compare key including a bit that indicates that the value of the second one of the fields is within the second range.

4. The network device of claim 1, wherein the value comprises a bit of a bitmap and wherein each bit of the bitmap is mapped to a respective range of values stored within the register memory.

5. The network device of claim 1, wherein the range of values is a range of port numbers, a range of IP addresses, a length of a network packet, or a range of a field.

6. A device, comprising:
   a content-addressable memory (CAM) comprising a plurality of access control entries, each access control entry being associated with an index and storing a value representing a numerical range;
   circuitry coupled to the CAM, the circuitry configured to:
   determine that an input value is within a first numerical range, the input value being related to a network packet received by the device;
   generate a compare key including a first field corresponding to the first numerical range and a second field corresponding to a second numerical range, a first value stored in the first field indicating that the input value is within the first numerical range and a second value stored in the second field indicating that the input value is not within the second numerical range;

provide, to the CAM, the compare key for locating a first access control entry within the CAM that stores a value representing the first numerical range corresponding to the first field of the compare key;
receive, from the CAM, the index associated with the first access control entry; and
select, based on the index associated with the first access control entry, an action to be performed on the network packet.

7. The device of claim 6, wherein:
the CAM implements an access control list comprising a plurality of action entries, each action entry storing an action, the index associated with the first access control entry referring to a first action entry of the plurality of action entries of the access control list; and
the circuitry is further configured to:
retrieve the first action entry from the access control list based on the index;
determine the action stored in the first action entry; and
perform the action on the network packet.

8. The device of claim 7, wherein the action includes at least one of: dropping the network packet, forwarding the network packet to a central processing unit, mirroring the network packet, setting a quality of service parameter for the network packet, setting a routing policy for the network packet, or enabling policing for the network packet.

9. The device of claim 8, wherein the compare key includes an array, the array including elements each corresponding to a respective numerical range and wherein the field is one of the elements.

10. The device of claim 9, wherein each element of the array is set to a first state indicating that a value is within the numerical range corresponding to the each element or to a second state indicating that a value is not within the numerical range corresponding to the each element.

11. The device of claim 6, wherein the CAM includes a plurality of portions; and
wherein the circuitry is configured to:
receive, from each of the plurality of portions, an index of an access control entry stored therein; and
select, based on each index, a corresponding action.

12. The device of claim 11, wherein:
the compare key has a first size or a second size; and
the CAM is configured to:
in response to receiving the compare key having the first size, generate the index from one of the portions; and
in response to receiving the compare key having the second size, generate the index from several of the portions.

13. The device of claim 11, wherein the circuitry is configured to provide, to the CAM, the compare key for locating within a first one of the portions or within a second one of the portions, wherein:
selection of the first one of the portions or the second one of the portions is determined based on a value of a register, the selection occurring between two consecutive compare keys being provided to the CAM by the circuitry.

14. The device of claim 11, wherein the circuitry is configured to prioritize from among actions, each selected using a corresponding one of the portions, to select one action.

15. The device of claim 11, wherein the circuitry is configured to provide the compare key to each of a first set of the portions and not to a second set of the portions.

16. The device of claim 6, wherein the CAM includes a plurality of portions; and wherein the circuitry is configured to:
generate a first compare key including the first field that is set indicating that the input value is within the first numerical range; and
generate a second compare key including the second field that is set indicating that a second value is within second numerical range.

17. The device of claim 6, further comprising:
a register memory storing the first numerical range as a minimum value and a maximum value; and
comparison circuitry configured to:
determine that the input value is greater than or equal to the minimum value and less than or equal to the maximum value; and
in response to determining that the input value is greater than or equal to the minimum value and less than or equal to the maximum value, set the first field.

18. The device of claim 6, wherein the circuitry is configured to locate the action using the index of the first access control entry as an index into a table of actions, the action included in the actions.

19. The CAM of claim 6, wherein the circuitry is configured to search within a pre-determined subset of the plurality of access control entries of the CAM for the first access control entry based on an ingress port or an egress port of the network packet.

20. A method, comprising:
receiving, at a device, a network packet; and
determining, by the device, to perform an access control action on the network packet, the determining to perform the access control action including:
determining that a value corresponding to a portion of the network packet is within a first range of values;
generating a compare key for the network packet, the compare key including an array including a first element indicating that the value is within the first range of values and a second element indicating that the value is not within a second range of values, the compare key and having a pre-determined size;
locating, within a portion of content-addressable memory (CAM) of the device, an access control entry corresponding to the compare key, a size of the portion of the CAM being based on the size of the compare key;
receiving, from the CAM, an index corresponding to the access control entry; and
selecting, based on the index, the access control action.

21. The method of claim 20, further comprising:
populating the CAM with access control entries, each of the access control entries corresponding to a respective access control action, wherein the selected access control action is selected from the respective access control actions.

22. The method of claim 20, wherein:
the array includes elements each corresponding to a respective range of values; and
two of the elements are set to:
a same first state indicating that the value is within one of the ranges of values corresponding to the two of the elements; or
a same second state indicating that the value is within both of the ranges of values corresponding to the two of the elements.

23. The method of claim 20, further comprising:
receiving, from the CAM, a plurality of indexes, each of the indexes being an index to the access control entry stored within the CAM;
determining a respective access control action for each of the plurality of indexes, wherein each respective access control action forms a plurality of access control actions; and
selecting, from the plurality of access control actions, one of the plurality of access control actions.

24. The device of claim 10, wherein the action is a first action;
wherein the index is a first index; and
wherein the CAM includes:
a second access control entry associated with a second index and storing a second value representing the second numerical range; and
a third access control entry associated with a third index and storing a third value representing a third numerical range;
wherein the circuitry is configured to:
based on the first field and the second field of the compare key, receive the second index but not the third index from the CAM; and
select a second action based on the second index.

25. The device of claim 24, wherein the circuitry is configured to prioritize the first action over the second action based on pre-determined configuration; and
perform the first action instead of the second action on the network packet.

26. The device of claim 25, wherein the pre-determined configuration includes priority encoding, the priority encoding indicating that the second index is associated with a lower priority than the first index.

27. The method of claim 20, further comprising: determining the portion of content-addressable memory (CAM) of the device based on an ingress port or an egress port of the network packet.

* * * * *